United States Patent
Hofschulte et al.

[11] Patent Number: 6,158,811
[45] Date of Patent: Dec. 12, 2000

[54] ADJUSTING DEVICE FOR AN AUTOMOBILE SEAT

[75] Inventors: Wolfram-N. Hofschulte, Bonndorf; Uwe Breitfeld, Althengstett; Joerg Burger, Sindelfingen, all of Germany

[73] Assignees: IMS Morat Soehne GmbH; Burger Soehne GmbH & Co., both of Germany

[21] Appl. No.: 09/284,087

[22] PCT Filed: Oct. 7, 1997

[86] PCT No.: PCT/DE97/02311

§ 371 Date: Jun. 1, 1999

§ 102(e) Date: Jun. 1, 1999

[87] PCT Pub. No.: WO98/15423

PCT Pub. Date: Apr. 16, 1998

[30] Foreign Application Priority Data

Oct. 8, 1996 [DE] Germany ............... 196 41 372

[51] Int. Cl.[7] .................................................. B60N 2/12
[52] U.S. Cl. ................... 297/362; 297/362.11; 297/330
[58] Field of Search .......................... 297/362, 330, 297/344.1, 344.17

[56] References Cited

U.S. PATENT DOCUMENTS

| | | | |
|---|---|---|---|
| 4,898,423 | 2/1990 | Kolle et al. | 297/362 |
| 5,088,841 | 2/1992 | Ikegaya et al. | 297/330 X |
| 5,435,624 | 7/1995 | Bray et al. | 297/362 X |
| 5,470,129 | 11/1995 | Ferrero | 297/330 |
| 5,483,853 | 1/1996 | Moradell et al. | 297/362.11 X |
| 5,709,363 | 1/1998 | Matsuhashi | 297/330 X |
| 5,882,075 | 3/1999 | Partington et al. | 297/330 X |
| 6,000,757 | 12/1999 | Sovis | 297/330 X |

FOREIGN PATENT DOCUMENTS

| | | |
|---|---|---|
| 0 197 638 A2 | 10/1986 | European Pat. Off. . |
| 28 36 006 A1 | 2/1980 | Germany . |
| 33 07 049 A1 | 9/1984 | Germany . |
| 84 30 729 U1 | 1/1985 | Germany . |
| 36 34 020 C1 | 5/1988 | Germany . |

*Primary Examiner*—Peter M. Cuomo
*Assistant Examiner*—Rodney B. White
*Attorney, Agent, or Firm*—Pendorf & Cutliff

[57] ABSTRACT

An adjusting device for an automobile seat having a back, a seating part formed by a seat substructure and a seat cushion, and with a side part that is guided horizontally by means of rails. The adjusting device can selectively regulate the seating part with respect to height, leaning or longitudinal distance. The adjusting device is formed by at least one fixed planetary gear system with a rotation drive device associated with, for example the seat substructure, the side part or seat rail and placed in a gear box casing. The planetary gear system has at least one sun wheel, one planet wheel and one ring gear respectively. The sun wheel interacts with the rotation driving device to operate the adjusting device.

23 Claims, 8 Drawing Sheets

ADJUSTING DEVICE FOR AN AUTOMOBILE SEAT

BACKGROUND OF THE INVENTION

1. Field of the Invention

The invention concerns an adjustment device for a vehicle seat having a back and a seat part formed by a seat substructure and a seat cushion with a side part and which is guided longitudinally by tracks, which can selectively regulate the seat part with respect to height, tilt or longitudinal distance wherein the adjustment device is formed of at least one planetary gear system which is positionally fixed, for example on the seat sub-assembly, on the side part or on the seat track, and is provided in a drive gear housing, which planetary gear system comprises at least one sun gear, at least on planet pinion as well as at least one ring gear, wherein the at least one sun gear in acted upon by rotation drive means for operation of the adjustment device.

2. Description of the Related Art

It is generally known that the seats in modern vehicles are adjustable with respect to multiple parameters to thereby provide an ergonomically comfortable seating position for the person seated thereupon. Therein it is of particular consequence to adjust, besides the adjustment position of the seat back, the adjustment of the seating surface, that is, the seat part with the seat cushion, in the length, height and tilt.

An adjustment device of the above described type is generally known from DE-OS 28 36 005, which shows the kinematics of the seat adjustment as well as the associated adjustment elements, which work in cooperation with the individual seat components. A seat substructure is connected to the vehicle chassis via front and rear pivotably coupled pivotable levers and is adjusted in height by appropriate tilting of these pivot levers. On this seat substructure a carrier part is provided, on which at the front at least one knuckle joint is coupled for tilt adjustment of the side part, of which the other end is connected with a seat part. The whole seat unit is guided on a track mounted on the vehicle floor and is longitudinally adjusted by means of a rack in engagement with an associated pinion or a spindle with a spindle nut.

In order to adjust the seat in height, torque is applied in the conventional manner to a linkage point of the 4-point-kinematic a torque is applied by means of a by a tooth segment of a pinion rotating about the linkage-rotating-point.

The same operating principle is employed by as rule for tilt adjustment, for this a further lever is employed at the front besides the 4-point-kinematic or by configuration of a 5-kinematic.

An adjustment device with the above described characteristics, that is, with adjustment means for adjusting the longitudinal, height and tile positions of a vehicle seat, is known from U.S. Pat. No. 4,765,582. Herein each adjustment means engages both sides of the vehicle seat and has either a lever mechanism for the manual operation or respectively one electrically operated adjustment means for each side and adjustment device.

The adjustment devices are respectively comprised of an intermediate or reduction gear and a planetary gear, each of which are provided with four planet pinions, which are secured to a planet pinion carrier and which are in engagement with an associated sun gear. The intermediate or reduction gears are respectively driven by flexible shafts from an assigned electro-motor provided below the corresponding seat, that is, the assigned drive motor acts upon two adjustment devices. This sets a minimal size for the motors. Further, a simple conversion from manual operation to motor operation is not possible, rather it requires a complete change-out of the adjustment devices. This is on the one hand expensive and on the other hand requires the stockpiling of extra spare parts.

Beginning with this state of the art it is the object of the present invention to provide an adjustment device for a vehicle seat of the above described type for the longitudinal-, height- and tilt adjustment thereof, which is simple to operate and which operates reliably both by means of manual operation as well also electro-motor and exhibits a high degree of self-retardation or self-locking during vehicle crash. In particular the device should be versatile in venues of employment.

In accordance therewith the adjustment device according to the invention is comprised of a planetary gear system which is positionally fixed, for example on the seat substructure, the side part or the seat track, and provided in a drive gear housing, and which includes at least one sun gear, at least one planet pinion as well as at least one ring gear, wherein the at least one sun gear is acted upon by a rotation driving device for operation of the adjustment device.

Preferably the planetary gear system includes two planet pinions with a first and with a second ring gear as well as with at least a common planet pinion, which is in engagement with a common sun gear.

Therein the first ring gear and the second ring gear advantageously exhibit respectively a gearing with differential modulus ($m=t/\pi$), whereby a different rotation angle results upon operation of the common sun gear.

In a preferred embodiment of the invention it is envisioned that the first ring gear is provided at a fixed location and that the second ring gear rotates concentrically relative to the first ring gear and serves as adjustment element. Thereby, and on the basis that one of the two ring gears has a gear ring with a different modulus, it is achieved that upon rotation of the common sun gear the rotationally moveable ring gear rotates with respect to the fixed ring gear.

According to a preferred further embodiment of the invention, the rotation driving device is formed as an electro-motor, which via an attached gear acts upon the common sun gear. Thereby it is advantageous when the motor is connected to the gear housing and together therewith forms a single construction component.

According to an alternative embodiment a manual gear can be provided as rotation drive means, which acts upon the common sun gear. A supplemental gear is not necessary in this case and can be dispensed with, since the size of the hand wheel on the one hand and the magnitude of the torque to be applied on the other hand provide for a problem free operation by hand.

According to a further embodiment of the invention a spring element is provided for taking up of slack between the drive gear housing and the ring gear, which tensions the ring gear against the drive gear housing. Therein the torque of the engagement between the first and the second ring gear as well as the common sun gear and the at least one planet pinion results in a capturing or trapping of the tooth flank due to the spring force of the spring element, whereby both friction as well as noise generation are reduced.

In a further advantageous embodiment of the invention, selectively the first or second ring gear are provided fixed against rotation on the seat substructure, on the side part or on a seat track guided on a lower track, while the other respectively rotationally moveable ring gear operates or actuates the seat part for height, tilt or distance adjustment of the vehicle seat. It is advantageous when herein the respective rotationally moveable ring gear is provided with a lever, which lever acts upon the seat part.

According to a further preferred embodiment of the invention the first ring gear is provided fixed against rotation and serves as drive gear housing while the rotationally moveable second ring gear works in cooperation with the seat part as adjustment element.

According to a working embodiment of the inventive adjustment device for longitudinal adjustment of the vehicle seat the gear housing is provided on the seat part, preferably on a guide track associated with the seat part, and the rotationally moveable ring gear is connected to a pinion fixedly against rotation, which is in engagement with a positionally fixed rack associated with the lower track and therewith makes possible the longitudinal adjustment of the vehicle seat.

For the height adjustment of the vehicle seat according to another embodiment of the inventive adjustment device, the respective rotational ring gear is connected with a pivot lever of a first pivot lever pair and acts upon this, wherein the pivot lever is respectively pivotably connected to appropriate mounting points on the seat subassembly and on the upper track and connects these with each other.

In a third embodiment of the inventive adjustment device the respective rotationally moveable ring gear is connected with a pivot lever of a second pivot lever pair and acts upon this, wherein also here the pivot levers are respectively pivotably connected in appropriate mounting points on the side part and on the seat cushion and thereby connects these with each other. In this third adjustment device the ring gear connected with the second pivot lever adjusts the tilt of the seat part.

Advantageously in further embodiment of the invention the respective rotational moveable ring gear with the pivotable first or second pivot lever can form a single construction component, that is, in place of a, for example, rod shaped lever the rotationally moveable ring gear is connected at two points respectively with the seat components which are moveable relatively to each other, for example, connecting the side part and the seat cushion for the tilt adjustment, or connecting the side part or the seat subassembly with the upper track for the height adjustment.

Advantageously the force transmitting elements of the adjustment device are self-retardingly engaged with each other. Thereby it is achieved, that a completed seat adjustment does not change by itself and thus a supplemental locking mechanism or adjustment fixing mechanism can be dispensable with.

A further preferred embodiment of the invention envisions on each vehicle seat three positionally fixed adjustment devices, wherein of these respectively one serves as adjustment device for adjustment of the height of the seat part, one serves for adjustment of the tilting of the seat cushion and one serves for longitudinal adjustment of the vehicle seat, and wherein each adjustment device is controllable independently of each other.

Therewith it is ensured that each occupant can adjust the respective seat to the best position.

In view of the space limitations which among other things are important considerations in a vehicle, it can be of advantage when the drive unit, for example only the motor alone or the electro-motor with the associated gear which acts upon the common sun gear of the planetary gear system, is provided in a different place spatially separated from the location of the ring gear in the area of the vehicle seat. By this variation of the invention the planetary gear system drive units and the rotation driving device with associated gear are connected with each other selectively by a rigid or a flexible drive element. With this unique feature of the inventive adjustment device it becomes possible to optimize the design of the vehicle seat, without being hindered by the space requirement of the necessary drive units.

Particularly considering the simplification of the process of the assembly of the preferably three common planet pinions of the inventive adjustment device, according to a further advantageous embodiment of the invention a free stem disk is provided concentrically to the common sun gear, which is provided with a number of stems or arms corresponding to the number of planet pinions to be guided, which rotationally receives the planet pinions, and by means of which these are held both radially to the sun gear and to the ring gear in the correct separation.

These and further advantageous embodiments and improvements of the invention are characteristics of the dependent claims.

BRIEF DESCRIPTION OF THE DRAWINGS

On the basis of an embodiment of the invention shown in schematic figures the invention, preferred embodiments, and improvements of the invention as well as particular advantages of the invention will be discussed and described in greater detail.

There are shown.

DETAILED DESCRIPTION OF THE INVENTION

Figure 1:
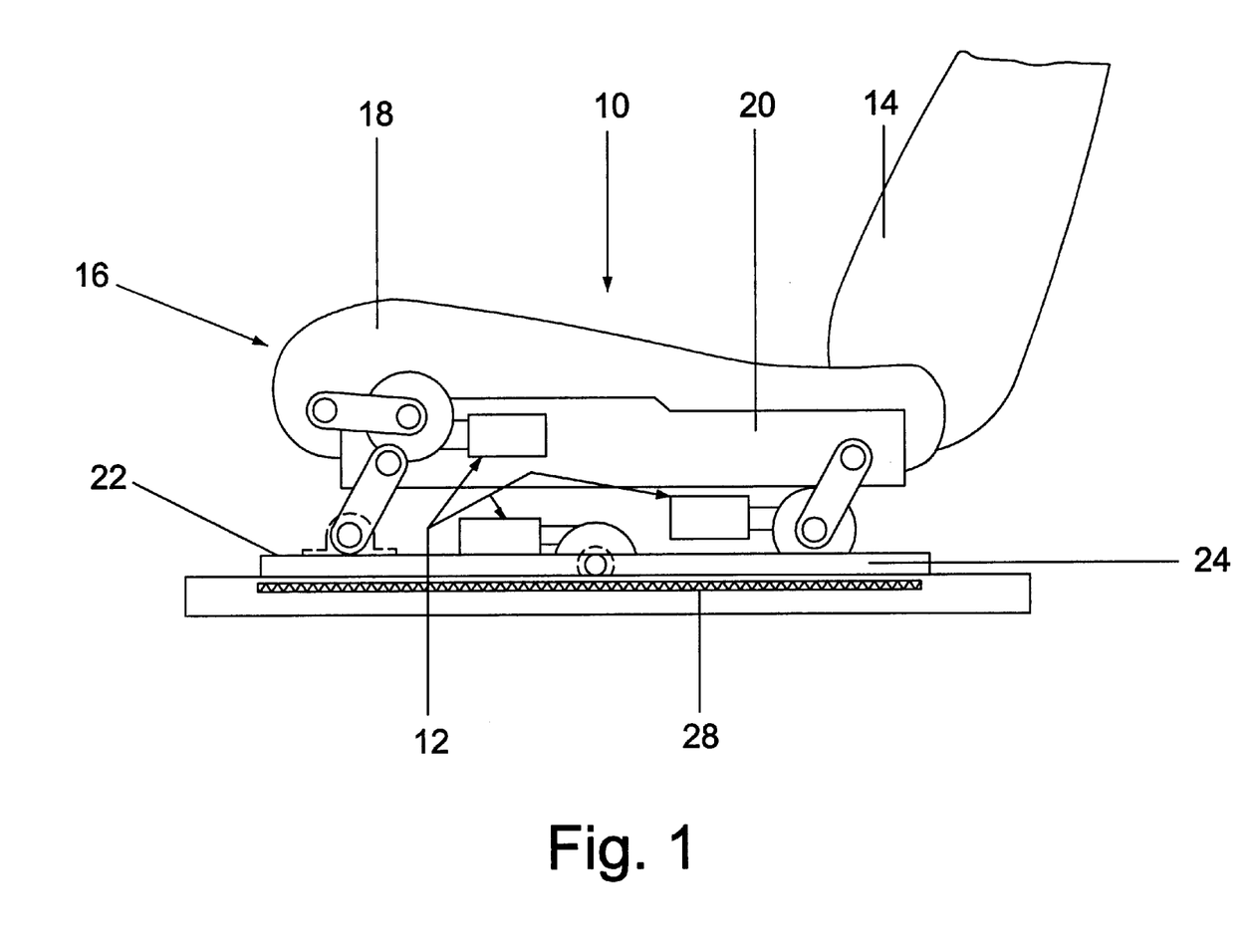
FIG. 1 a side view of a vehicle seat equipped with three inventive adjustment devices.

In FIG. 1 a part of a vehicle seat 10 is shown with three inventive adjustment devices 12, which respectively are acted upon by a motorized drive, shown in side view, in order to show how the inventive adjustment devices 12 bring about the seat adjustment.

The vehicle seat 10 is comprised of an seat back 14, which is only partially shown, and a seating part 16, which seating part 16 comprises a seat cushion 18, a side part 20 and a seat sub-assembly 22. The seat sub-assembly is comprised, to the extent shown here, essentially of an upper track 24 which supports itself upon a lower track 26 represented in FIG. 7 in cross-section and in FIG. 8 in diagonal view.

Further there is shown in FIG. 1, that for the inventive adjustment of the vehicle seat 10, or more correctly the seat part 16, this is provided in total with three adjustment devices 12 at different points of the vehicle seat 10, namely for the height adjustment below the rearward end of the side part 20, for the tilt adjustment on the sides of the front end of the side part 20 and for the longitudinal adjustment approximately centrally below the side part 20 on the seat sub-assembly 22. There the adjustment device cooperates with a stylized represented, positionally fixed, not in greater detail shown vehicle floor or with the rack 28 connected to the lower track 26.

In the following the individual design variants of the inventive adjustment device shall be described in greater detail on the basis of representations in FIGS. 2 through 5.

Figure 2:
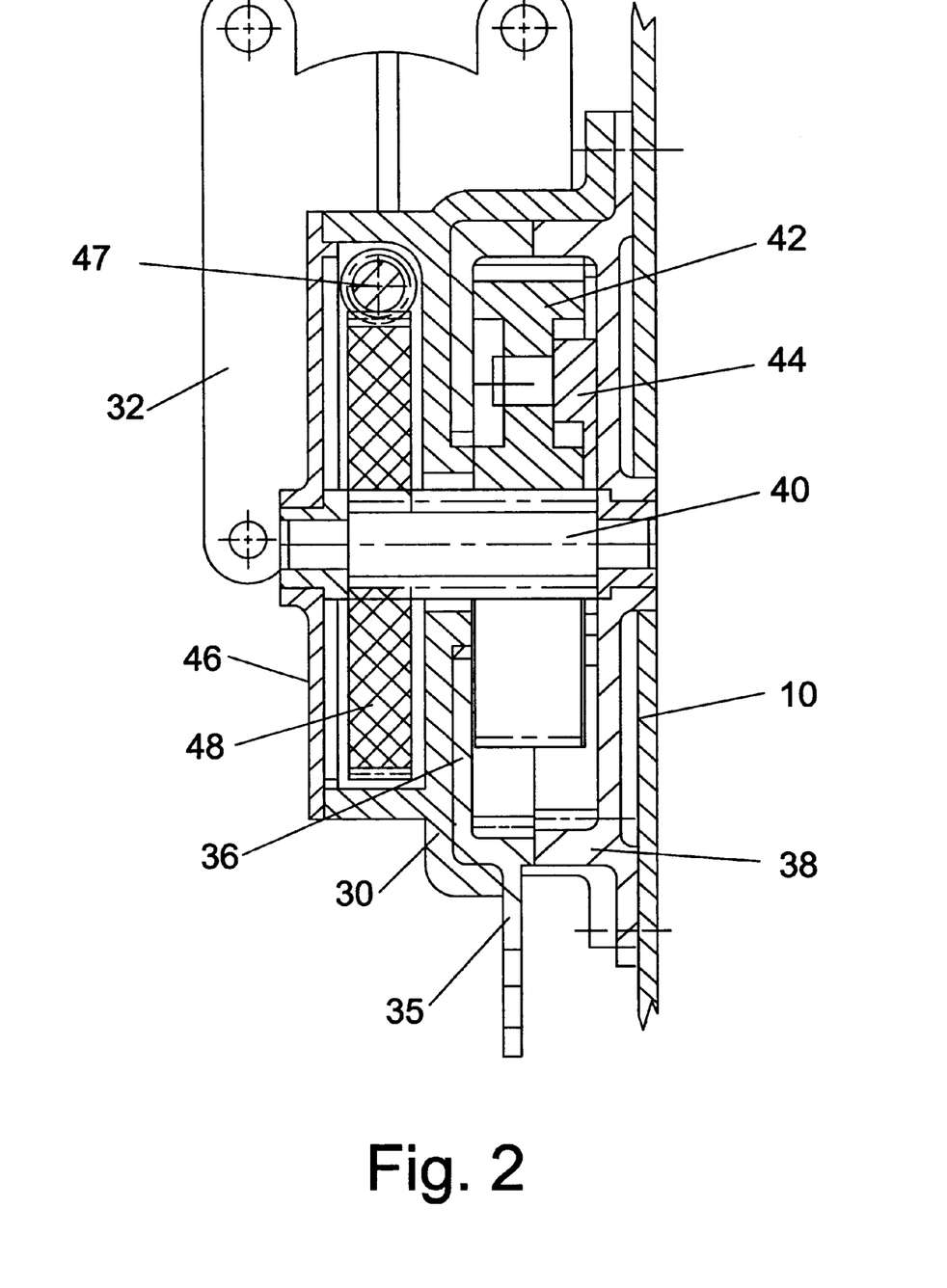
FIG. 2 a longitudinal section through the planetary gear system of an inventive adjustment device with motor drive.

In FIG. 2 there is shown a longitudinal section through the drive housing 30 of an inventive adjustment device 12 which is acted upon by an electro-motor 32 as motorized drive and which is mounted upon a vehicle seat 10 which is not shown in greater detail. The drive housing 30 receives a planetary gear system 34, which includes a first ring gear 36 with an integrated lever 35 and by a second ring gear 38, which is connected with a part of the vehicle seat, as well as by a common sun gear 40 and by planet pinions 42 which serve for transmission of mechanical force or, as the case may be, torque.

The transmission of the drive force of the motor 32 is accomplished via an associated gear 45, which is mounted or provided in a chamber or space separated from the remaining drive housing 30, which is closed off to the outside by a lid 46. The associated gear is designed as a worm gear and exhibits a worm 47 as pinion and a worm wheel as drive 48.

On the basis of the views shown in FIGS. 1 and 2 it becomes clear, that the inventive adjustment device is designed to be slender and very compact, so that its incorporation in a vehicle seat is possible with ease.

For better understanding the embodiments of the inventive adjustment device shown in the additional figures, the same reference numbers are used to indicate the same components and features.

Figure 3:
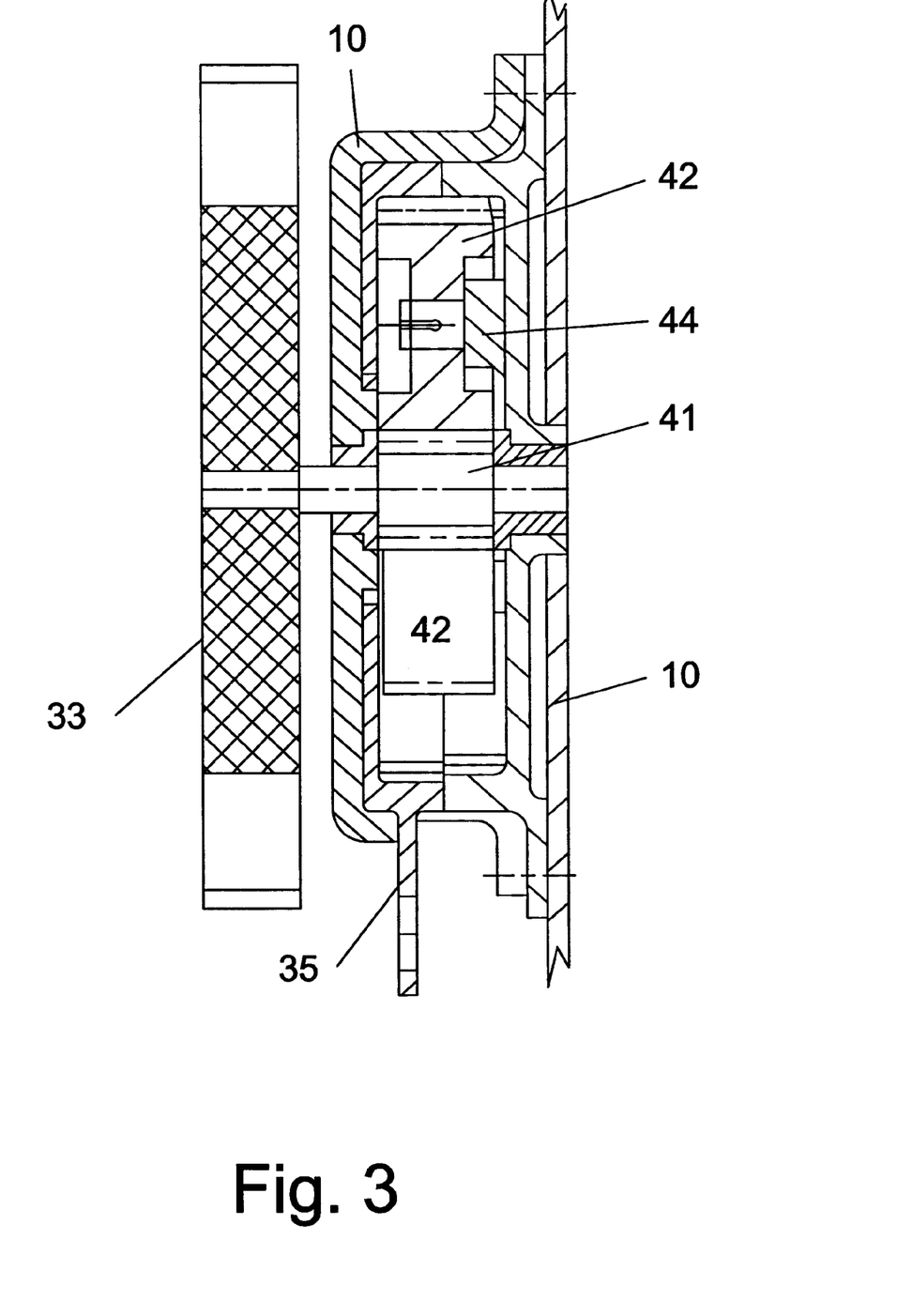
FIG. 3 a longitudinal section through the planetary gear system of an inventive adjustment device with manual drive.

In FIG. 3 there is shown likewise a longitudinal section through the drive housing 31 of a further very similar designed inventive adjustment device 12, which however for distinction is acted upon by a manual gear 33 for drive means which is provided on a not in greater detail shown part of the vehicle seat 10.

In departure from the embodiment shown in FIG. 2, there is no housing 31 exhibiting a separate chamber, but rather the manual gear 33 is, with small separation to the housing 31, seated upon an axial stud of a common sun gear 41. The first ring gear 36 and the second ring gear 38 as well as the planet pinion 42 guided on the free bridging or cross-piece or, as the case may be, the projection disk 44, correspond to those according to FIG. 2.

Figure 4:
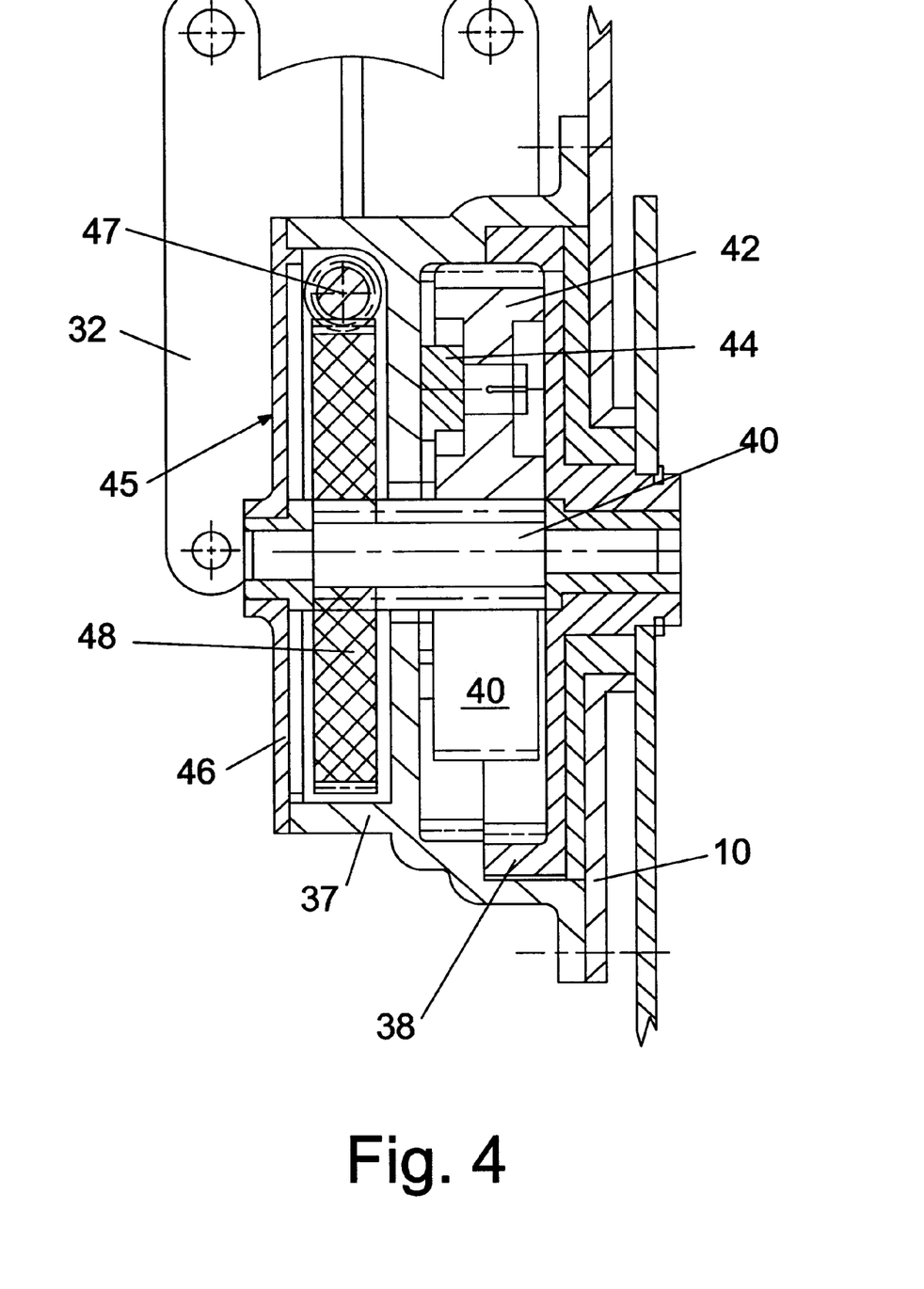
FIG. 4 a longitudinal section through a drive gear housing of an inventive adjustment device with motorized drive; wherein the drive housing forms a construction unit with the ring gear.

FIG. 4 shows a longitudinal section through a further embodiment with a drive housing 37 of an inventive adjustment device 12 with motorized drive 32, in which the drive housing 37 together with a first ring gear forms a construction unit, which is connected fixed against rotation with the vehicle seat 10. Further features of this embodiment correspond with those according to FIG. 2.

Figure 5:
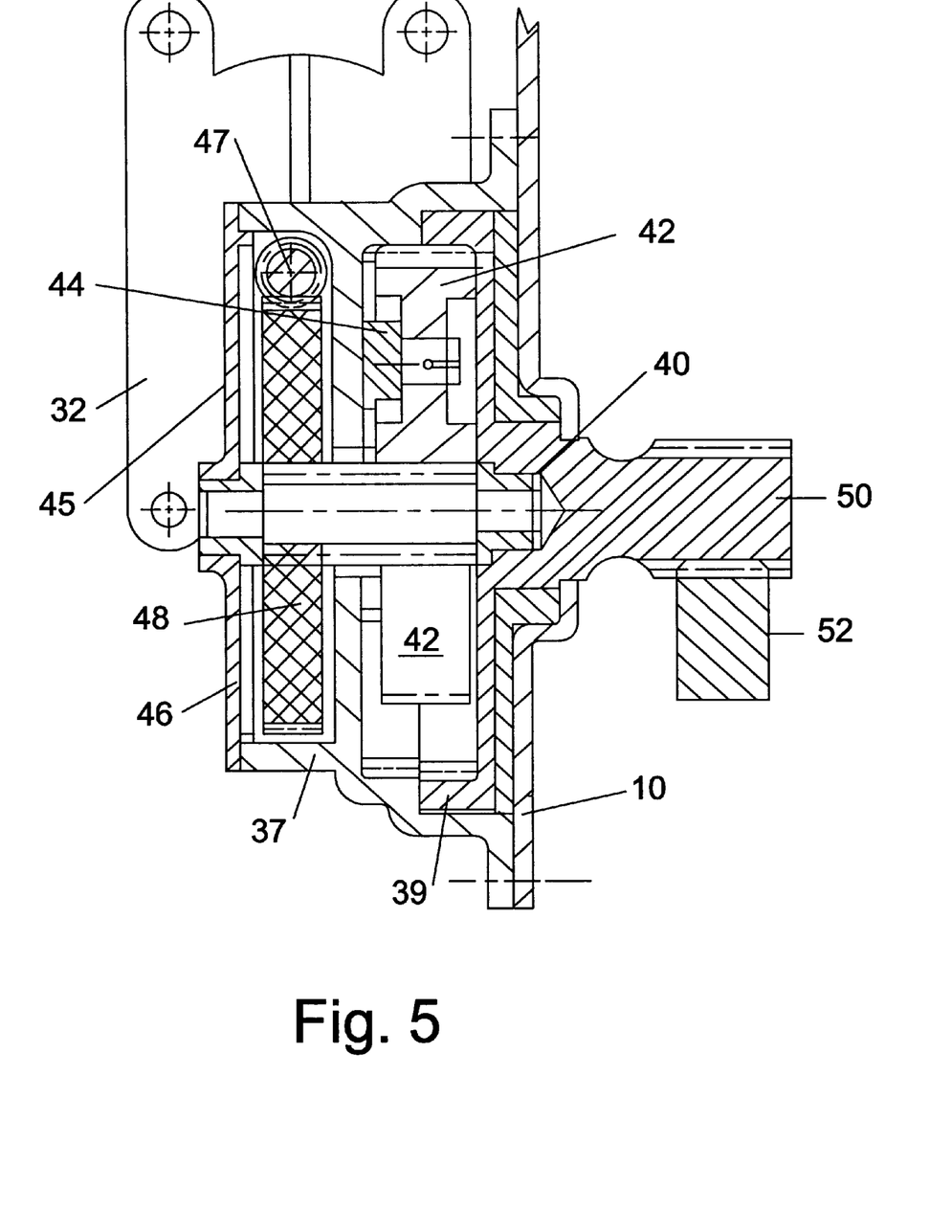
FIG. 5 the device according to FIG. 5 (sic), wherein the other planetary gear system forms a construction unit with a pinion which is in engagement with a rack.

In FIG. 5 the same arrangement as in FIG. 4 is shown, wherein however departing therefrom the second ring gear 39 forms, with the coaxial pinion 50 formed thereupon, a single construction component. The pinion 50 is shown in engagement with a rack 52 which is shown in cross-section, which for its part is positionally fixedly anchored and so makes possible the longitudinal adjustment of the vehicle seat 10 which is provided with this adjustment device 12.

Figure 6:
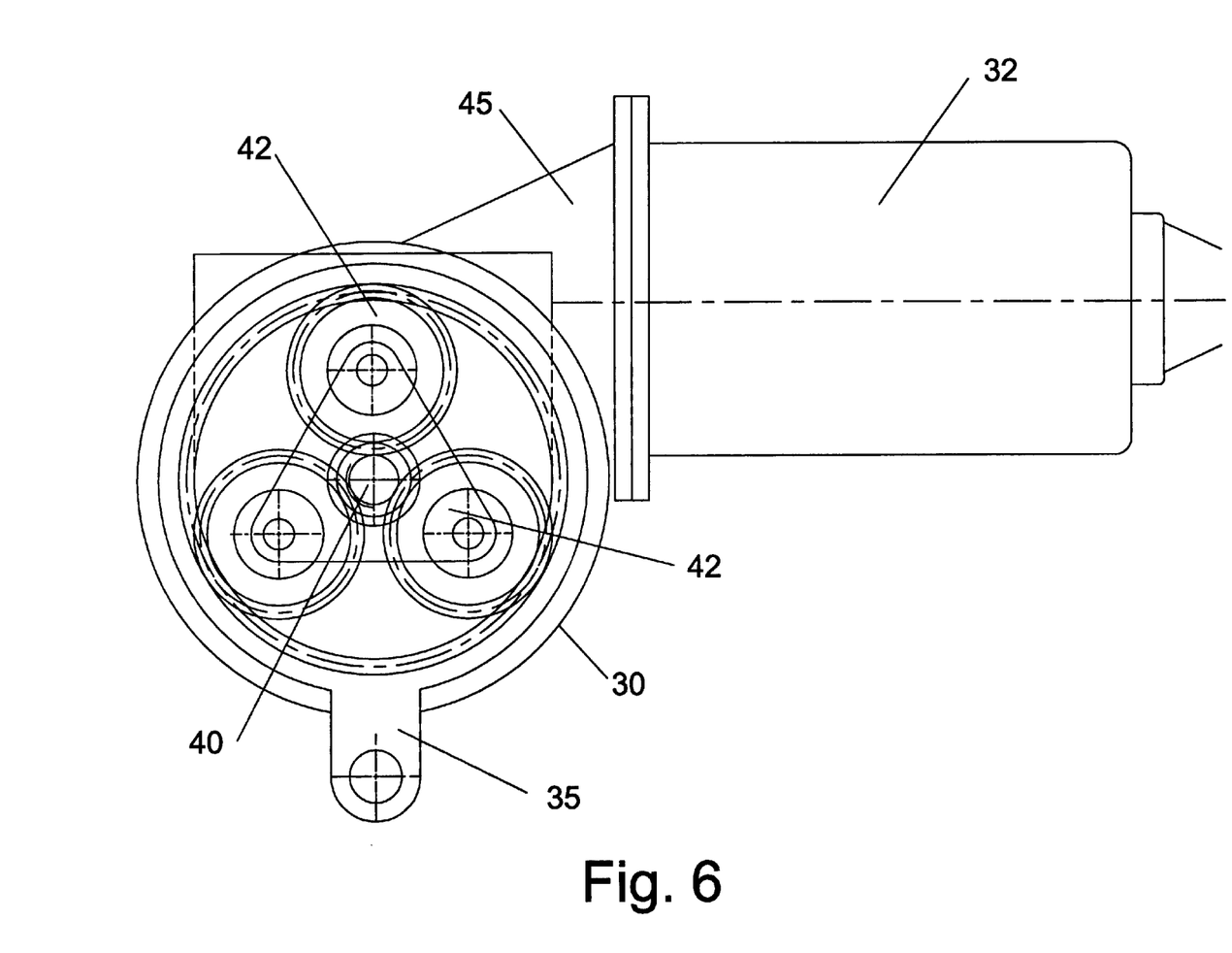
FIG. 6 a side view of an inventive adjustment device with motorized drive.

In FIG. 6 a side view of the inventive adjustment device according to FIG. 2 with an electro-motor 32 as drive unit is shown from the direction of the side on which it is assembled on the seat 10. In this view this second ring gear is removed, so that a view into the planetary gear system 34 is possible. Herein the housing 30 can be seen as well as the three planet pinions 42 encompassed by the first ring gear 36 with the thereupon formed position lever 35, which planet pinions 42 are positioned respectively offset about 120° to each other, as well as the triangular shaped, the sun gear 40 concentrically encompassing projection disk 44 serving as the guide thereof.

Figure 7:
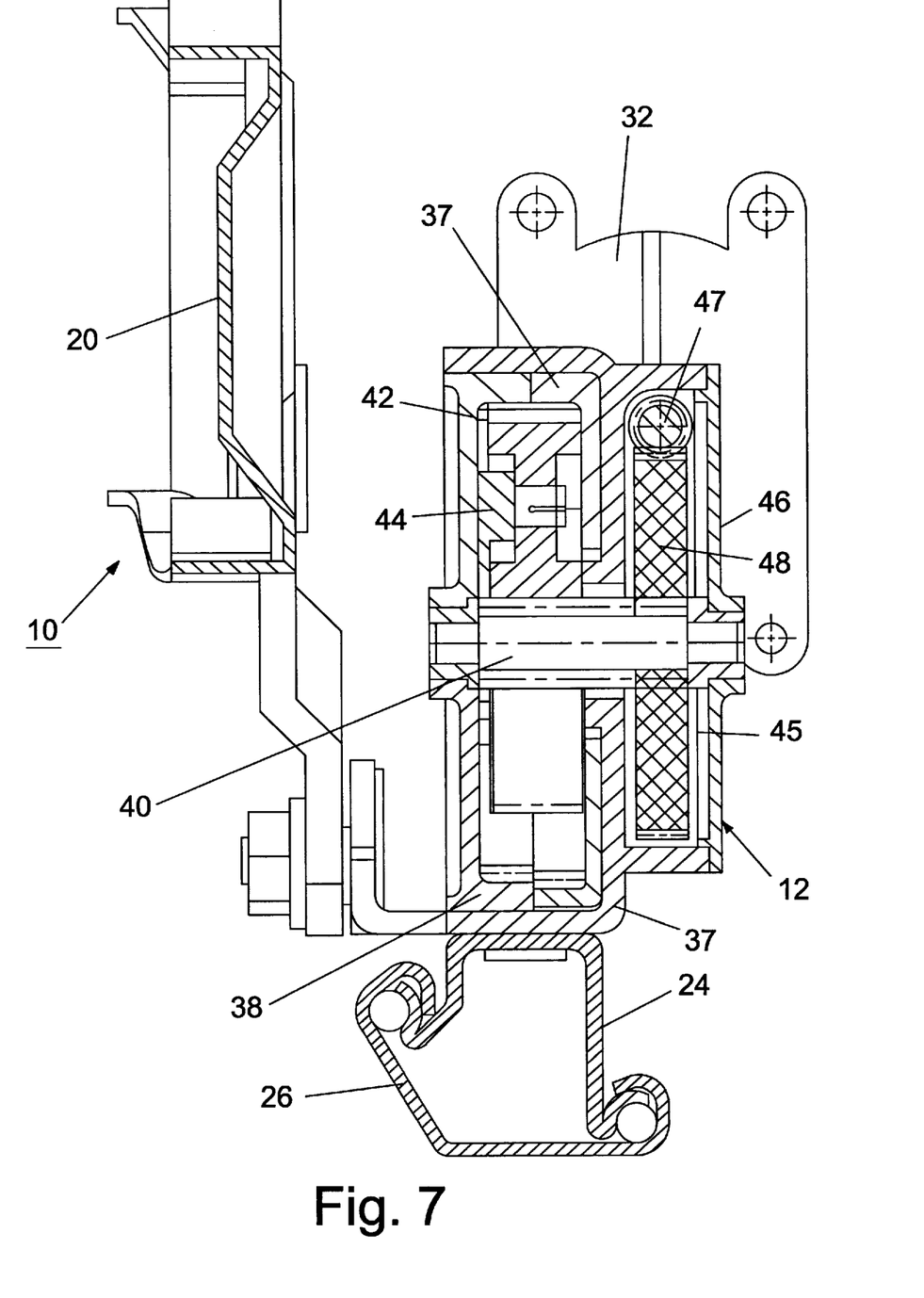
FIG. 7 a longitudinal section through an adjustment device with motorized drive connected to an upper track.

In FIG. 7 there is shown a longitudinal section through a vehicle seat 10, not shown in greater detail, on an upper track 24 with a side part 20 associated inventive adjustment device 12 driven by electro-motor drive 32, of which the design practically corresponds to the variant shown in FIG. 2.

Figure 8:
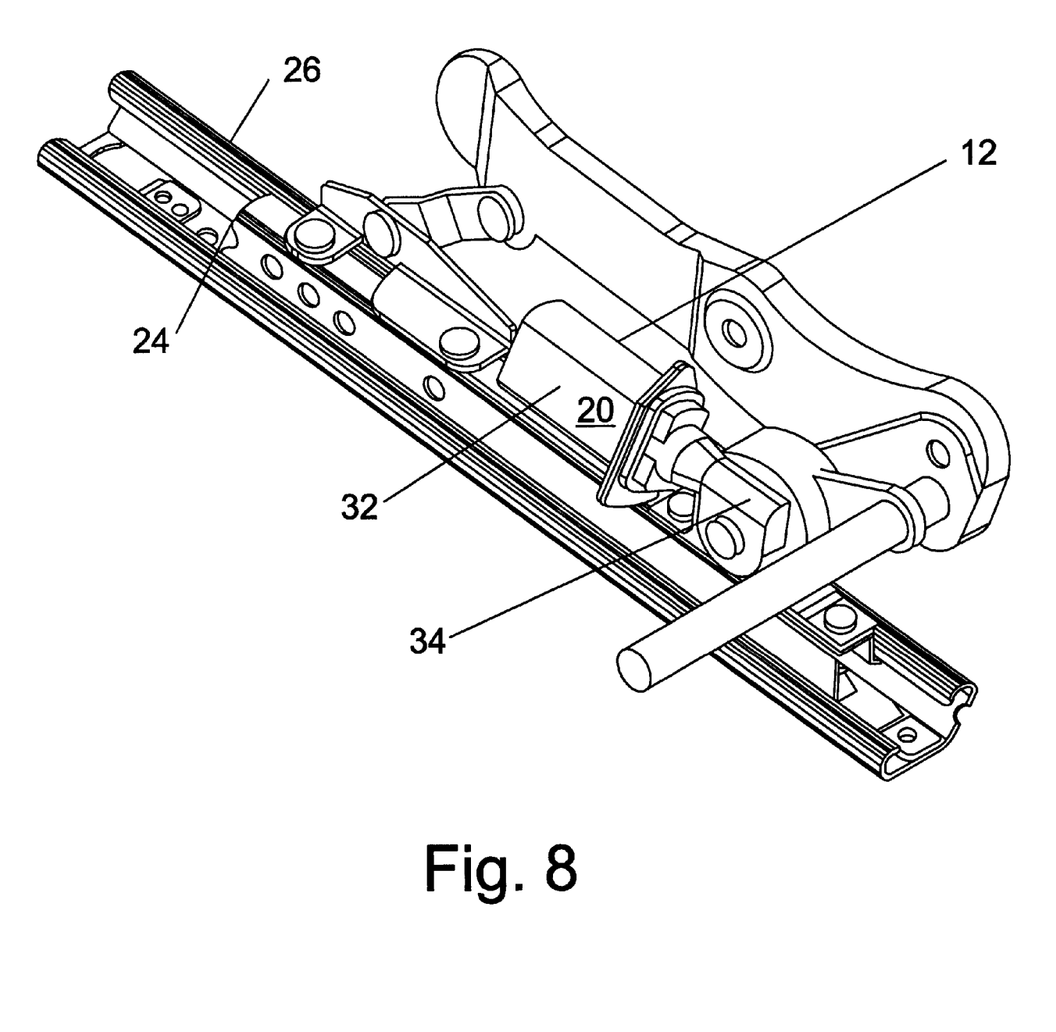
FIG. 8 a diagonal view of an adjustment device according to FIG. 7 working in cooperation with a side part.

Finally FIG. 8 shows a diagonal view of the adjustment device 12 shown in FIG. 7 working together with the side part 20, which is provided upon an upper track 24, which for its part is guided in an upwardly open, not in greater detail shown, lower track 26 secured on the vehicle floor.

The inventive adjustment device 12 is conceived of as a reduced coupling drive for adjustment of the positional height, tilt and longitudinal distancing of a vehicle seat 10. The device 12 is comprised of a gear system 34 connected directly with the vehicle seat 10, which is provided in an appropriate housing 30, and a special drive, which is constructed as an electro-motor 23 or as a manual drive 33. The electro-motor is connected via a modularly formed auxiliary drive gear 45 with the actual gears 34, that is, with the sun gear 40 comprising a part thereof.

Normally the associated gears 45, as shown in the figures, are conceived of as an integral construction component of the adjustment device 12. However, it is according to the invention possible, that supplemental gears 45 and the electro-motor 32 are provided spaced apart and to transmit the drive force upon the gear 34 on the secured vehicle seat 10 via an appropriate rigid or flexible connection, for example a bendable shaft.

Reference Number List

10 Vehicle seat
12 Adjustment device
14 Seat back
16 Seat part
18 Seat cushion
20 Side part
22 Seat sub-assembly
24 Upper track
26 Lower track
28 Rack
30 Gear housing
31 Gear housing
32 Electro-motor
33 Hand wheel
34 Planet pinion system
35 Adjustment lever
36 First ring gear -continued Reference Number List

| | |
|---|---|
| 37 | First ring gear |
| 38 | Second ring gear |
| 39 | Second ring gear |
| 40 | Sun gear |
| 42 | Planet pinion |
| 44 | Projection disk (free crosspiece) |
| 45 | Auxiliary gear |
| 46 | Lid |
| 47 | Worm |
| 48 | Star gear |
| 50 | Pinion |
| 52 | Rack |

What is claimed is:

1. An adjustment device for a vehicle seat which includes a seat back and a seat part, the seat part including a seat sub-assembly and a seat cushion with side parts, the seat being longitudinally displaceable on tracks, the adjustment device being provided for selective adjustment of the seat part with respect to at least one of height, tilt and longitudinal displacement, wherein the adjustment device includes one planetary gear system which is positionally fixed, and which is provided in a drive gear housing, said planetary gear system comprising at least two planetary gear trains with one common sun gear, at least first and second ring gears respectively circumscribing said common sun gear, as well as at least one common planet gear provided in between, and in engagement with, said common sun gear and said at least first and second ring gears, wherein said first ring gear and said second ring gear respectively exhibit a different gear modulus, and wherein said at least one sun gear is in cooperative engagement with rotation drive means for operation of the adjustment device.

2. An adjustment device as in claim 1, wherein said at least one planetary gear system is positionally fixed on one of the seat sub-assembly, the side part, and the seat track.

3. Adjustment device according to claim 1, wherein the first ring gear is provided positionally fixed and the second ring gear rotates concentrically relative to the first ring gear and serves as seat adjustment element.

4. Adjustment device according to claim 1, wherein the rotational drive means is an electro-motor, which acts upon the common sun gear via an associated gear.

5. Adjustment device according to claim 4, wherein the associated gear is a worm gear.

6. Adjustment device according to claim 5, wherein the associated gear is integrated in the gear housing.

7. Adjustment device according to claim 4, wherein the electro-motor is connected to the drive housing and together therewith forms a construction unit.

8. Adjustment device according to claim 1, wherein the rotational drive means is a hand wheel which acts upon the common sun gear.

9. Adjustment device according to claim 1, wherein a spring element is provided for the reduction of slack between the drive gear housing and the ring gear, which tensions the ring gear against the gear housing.

10. Adjustment device according to claim 1, wherein selectively one of the first and the second ring gear is provided fixed against rotation on one of the seat sub-assembly, the side part and an upper seat track guided upon a lower track, and wherein the other respectively rotationally moveable ring gear actuates the seat part for one of height, tilt and longitudinal adjustment of the vehicle seat.

11. Adjustment device according to claim 10, wherein the respective rotationally moveable ring gear is provided with a lever, which lever acts upon the seat part.

12. Adjustment device according to claim 1, wherein the first ring gear is formed fixed against rotation and serves as gear housing and the second ring gear is rotationally moveable and works as an adjustment device in cooperation with the seat part.

13. Adjustment device according to claim 12, wherein the gear housing is secured to the seat part, and the rotationally moveable ring gear is connected fixed against rotation with a pinion, which is in engagement with a rack positionally fixed on the lower track and so accomplishes the longitudinal adjustment of the vehicle seat.

14. Adjustment device according to claim 13, wherein the gear housing is secured to a seat track associated with the seat part.

15. Adjustment device according to claim 12, wherein the respective rotationally moveable ring gear is operationally associated with a pivot lever of a first pivot lever pair, which pivot levers respectively are pivotably connected to the seat sub-assembly and the upper track.

16. Adjustment device according to claim 15, wherein the respective rotatable ring gear together with one of the pivotable first and second pivot lever forms a construction sub-assembly.

17. Adjustment device according to claim 15, wherein the ring gear connected with the first pivot lever adjusts the height of the seat part.

18. Adjustment device according to claim 1, wherein the respective rotatable ring gear is operably connected with a pivot lever of a second pivot lever pair, which pivot lever is pivotably coupled respectively on the side part and on the seat cushion.

19. Adjustment device according to claim 18, wherein the tilt of the seat is adjusted by the ring gear connected with the second pivot lever.

20. Adjustment device according to claim 1, wherein moveable elements of the adjustment device are in self locking engagement with each other.

21. Adjustment device according to claim 1, wherein on each vehicle seat three adjustment devices are provided positionally fixed, each adjustment device being provided respectively for the adjustment of the seat part, for adjustment of the tilt of the seat cushion as well as the longitudinal displacement of the vehicle seat, each adjustment device being controllable separately from the other adjustment devices.

22. Adjustment device according to claim 1, wherein a supplemental gear acting upon the common sun gear is provided distanced from the planetary gear system, and wherein the planetary gear system is connected selectively by means of a drive element for coupling of the rotational drive means with the supplemental gear.

23. Adjustment device according to claim 1, wherein a spring element is provided for reducing slack between the drive gear housing and the ring gears, which tensions the ring gears against the drive gear housing, such that torque produced upon rotational engagement between the first and the second ring gear as well as the common sun gear and the at least one planet gear results in a trapping of the tooth flank due to the s ring force of the spring element, whereby both friction as well as noise generation are reduced.

* * * * *